US008718826B2

(12) United States Patent
Ramachandran et al.

(10) Patent No.: US 8,718,826 B2
(45) Date of Patent: May 6, 2014

(54) SYSTEM FOR REMOTE CONTROL OF A CONDITION AT A SITE

(75) Inventors: Anil Ramachandran, Florissant, MO (US); David S. Drew, St. Louis, MO (US)

(73) Assignee: Emerson Electric Co., St. Louis, MO (US)

( * ) Notice: Subject to any disclaimer, the term of this patent is extended or adjusted under 35 U.S.C. 154(b) by 266 days.

(21) Appl. No.: 13/150,840

(22) Filed: Jun. 1, 2011

(65) Prior Publication Data

US 2011/0231020 A1     Sep. 22, 2011

(51) Int. Cl.
| | |
|---|---|
| G05B 21/00 | (2006.01) |
| G01M 1/38 | (2006.01) |
| G05B 13/00 | (2006.01) |
| G05B 15/00 | (2006.01) |
| G05D 23/00 | (2006.01) |
| G05D 1/02 | (2006.01) |
| G05D 1/10 | (2006.01) |
| G08B 1/08 | (2006.01) |
| H04M 3/00 | (2006.01) |
| H04W 24/00 | (2009.01) |

(52) U.S. Cl.
USPC ...... 700/278; 700/300; 700/302; 340/539.23; 455/420; 455/456.1

(58) Field of Classification Search
USPC .......... 700/275–278, 299, 300, 302; 340/500, 340/531, 539.1, 539.22, 539.23; 455/403, 455/418–420, 422.1, 456.1–456.3
See application file for complete search history.

(56) References Cited

U.S. PATENT DOCUMENTS

| | | | |
|---|---|---|---|
| 6,400,956 B1 * | 6/2002 | Richton | 455/456.3 |
| 7,324,833 B2 | 1/2008 | White et al. | |
| 7,434,742 B2 | 10/2008 | Mueller et al. | 236/46 C |
| 7,440,772 B2 | 10/2008 | White et al. | |
| 7,486,926 B2 | 2/2009 | White et al. | |
| 7,634,228 B2 | 12/2009 | White et al. | |
| 7,778,595 B2 | 8/2010 | White et al. | |
| 7,848,900 B2 | 12/2010 | Steinberg et al. | |
| 7,908,116 B2 | 3/2011 | Steinberg et al. | |
| 7,908,117 B2 | 3/2011 | Steinberg et al. | |
| 7,930,070 B2 | 4/2011 | Imes | |
| 7,953,390 B2 | 5/2011 | White et al. | |
| 7,970,379 B2 | 6/2011 | White et al. | |
| 8,010,237 B2 | 8/2011 | Cheung et al. | |
| 8,019,567 B2 | 9/2011 | Steinberg et al. | |
| 8,024,073 B2 | 9/2011 | Imes et al. | |
| 8,082,065 B2 | 12/2011 | Imes et al. | |

(Continued)

OTHER PUBLICATIONS

"Using Your Mobile Phone as a Proximity Sensor"; Richard Magnus, Jan. 25, 2010; 7 pgs.

(Continued)

Primary Examiner — Crystal J Barnes-Bullock
(74) Attorney, Agent, or Firm — Harness, Dickey & Pierce, P.L.C.

(57) ABSTRACT

A system is provided for remote control of at least one operating condition of a site. The system includes a proximity detection module at a residential site, which is configured to receive a communication regarding a location of a location reporting device or a mobile device. The proximity detection module is configured to alter or adjust a current temperature setting for the site based on a distance or location of the location reporting device or mobile device relative to the site.

24 Claims, 3 Drawing Sheets

(56) References Cited

U.S. PATENT DOCUMENTS

| | | |
|---|---|---|
| 8,090,477 B1 | 1/2012 | Steinberg |
| 8,099,195 B2 | 1/2012 | Imes et al. |
| 8,108,076 B2 | 1/2012 | Imes et al. |
| 8,131,497 B2 | 3/2012 | Steinberg et al. |
| 8,131,506 B2 | 3/2012 | Steinberg et al. |
| 8,174,381 B2 | 5/2012 | Imes et al. |
| 8,180,492 B2 | 5/2012 | Steinberg |
| 8,195,313 B1 | 6/2012 | Fadell et al. |
| 2006/0242018 A1 | 10/2006 | Shulman et al. |
| 2009/0160673 A1* | 6/2009 | Cirker .................. 340/825.69 |
| 2010/0282857 A1 | 11/2010 | Steinberg |
| 2010/0308119 A1 | 12/2010 | Steinberg et al. |
| 2010/0318227 A1 | 12/2010 | Steinberg et al. |
| 2011/0015802 A1 | 1/2011 | Imes |
| 2011/0046792 A1 | 2/2011 | Imes et al. |
| 2011/0046798 A1 | 2/2011 | Imes et al. |
| 2011/0046799 A1 | 2/2011 | Imes et al. .................. 700/286 |
| 2011/0046800 A1 | 2/2011 | Imes et al. |
| 2011/0172835 A1 | 7/2011 | Imes |
| 2011/0202185 A1 | 8/2011 | Imes et al. |
| 2011/0214060 A1 | 9/2011 | Imes et al. |
| 2011/0224838 A1 | 9/2011 | Imes et al. |
| 2011/0246898 A1 | 10/2011 | Imes et al. |
| 2011/0258048 A1 | 10/2011 | White et al. |
| 2011/0290893 A1 | 12/2011 | Steinberg |
| 2011/0307101 A1 | 12/2011 | Imes et al. |
| 2011/0307103 A1 | 12/2011 | Cheung et al. |
| 2011/0312386 A1 | 12/2011 | White et al. |
| 2012/0003990 A1* | 1/2012 | Lee .................. 455/456.1 |
| 2012/0023225 A1 | 1/2012 | Imes et al. |
| 2012/0046859 A1 | 2/2012 | Imes et al. |
| 2012/0064923 A1 | 3/2012 | Imes et al. |
| 2012/0065783 A1 | 3/2012 | Fadell et al. |
| 2012/0065935 A1 | 3/2012 | Steinberg et al. |
| 2012/0072033 A1 | 3/2012 | Imes et al. |
| 2012/0086562 A1 | 4/2012 | Steinberg |
| 2012/0093141 A1 | 4/2012 | Imes et al. |
| 2012/0101637 A1 | 4/2012 | Imes et al. |
| 2012/0125559 A1 | 5/2012 | Fadell et al. |
| 2012/0125592 A1 | 5/2012 | Fadell et al. |
| 2012/0126019 A1 | 5/2012 | Warren et al. |
| 2012/0126020 A1 | 5/2012 | Filson et al. |
| 2012/0126021 A1 | 5/2012 | Warren et al. |
| 2012/0128025 A1 | 5/2012 | Huppi et al. |
| 2012/0130546 A1 | 5/2012 | Matas et al. |
| 2012/0130548 A1 | 5/2012 | Fadell et al. |
| 2012/0130679 A1 | 5/2012 | Fadell et al. |
| 2012/0131504 A1 | 5/2012 | Fadell et al. |
| 2012/0135759 A1 | 5/2012 | Imes et al. |
| 2012/0158350 A1 | 6/2012 | Steinberg et al. |
| 2012/0179300 A1 | 7/2012 | Warren et al. |
| 2012/0186774 A1 | 7/2012 | Matsuoka et al. |
| 2012/0191257 A1 | 7/2012 | Corcoran et al. |
| 2012/0199660 A1 | 8/2012 | Warren et al. |
| 2012/0203379 A1 | 8/2012 | Sloo et al. |
| 2012/0229521 A1 | 9/2012 | Hales, IV et al. |
| 2012/0232969 A1 | 9/2012 | Fadell et al. |
| 2012/0233478 A1 | 9/2012 | Mucignat et al. |
| 2012/0239207 A1 | 9/2012 | Fadell et al. |
| 2012/0239221 A1 | 9/2012 | Mighdoll et al. |

OTHER PUBLICATIONS

"Home Heating Using GPS-Based Arrival Prediction", J. Scott, J. Krumm, B. Meyers, A.J. Bush and A. Kapoor; Microsoft Research; Feb. 2010; pp. 1-7.

"Adding GPS-Control to Traditional Thermostats: An Exploration of Potential Energy Savings and Design Challenges", M. Gupta, S.S. Intille and K. Larson; Massachusetts Institute of Technology; 2009; pp. 1-19.

* cited by examiner

SYSTEM FOR REMOTE CONTROL OF A CONDITION AT A SITE

FIELD OF INVENTION

The present disclosure relates to systems for remote control of environmental settings, and more specifically to control of temperature settings.

BACKGROUND

This section provides background information related to the present disclosure which is not necessarily prior art.

Many thermostats allow for programming time and temperature settings for various days of the week, and for setback of temperature settings during periods when the site is unoccupied. However, the typical thermostat requires entry of temperature settings for predicted time periods that the site might be unoccupied, which entails pressing the necessary series of different buttons to program the thermostat. If a user of such a thermostat is faced with a series of different buttons to press and screens to progress through to enter such temperature settings, the user is not likely to realize any energy savings due to the user's apprehension towards programming the thermostat. Moreover, the predicted time periods may not align with times that the site is actually occupied.

SUMMARY

This section provides a general summary of the disclosure, and is not a comprehensive disclosure of its full scope or all of its features.

Various embodiments are disclosed of a system for remotely controlling an operating condition of a site based on proximity of a location reporting device. In one embodiment, the system includes a proximity detection module located at a site, having a controller with a selectively enabled proximity detection mode, wherein when the proximity detection mode is enabled, the proximity detection module is configured to detect a distance between a location reporting device and the site and to responsively determine an adjustment to alter an operating temperature setting for the site based on the distance of the location reporting device. In another embodiment, the system includes a proximity detection module configured to detect when a mobile device is within a first zone, a second zone, or a third zone relative to the site, and to determine an adjustment to the current temperature setting for the site based on whether the mobile device is within the first zone, second zone or third zone.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
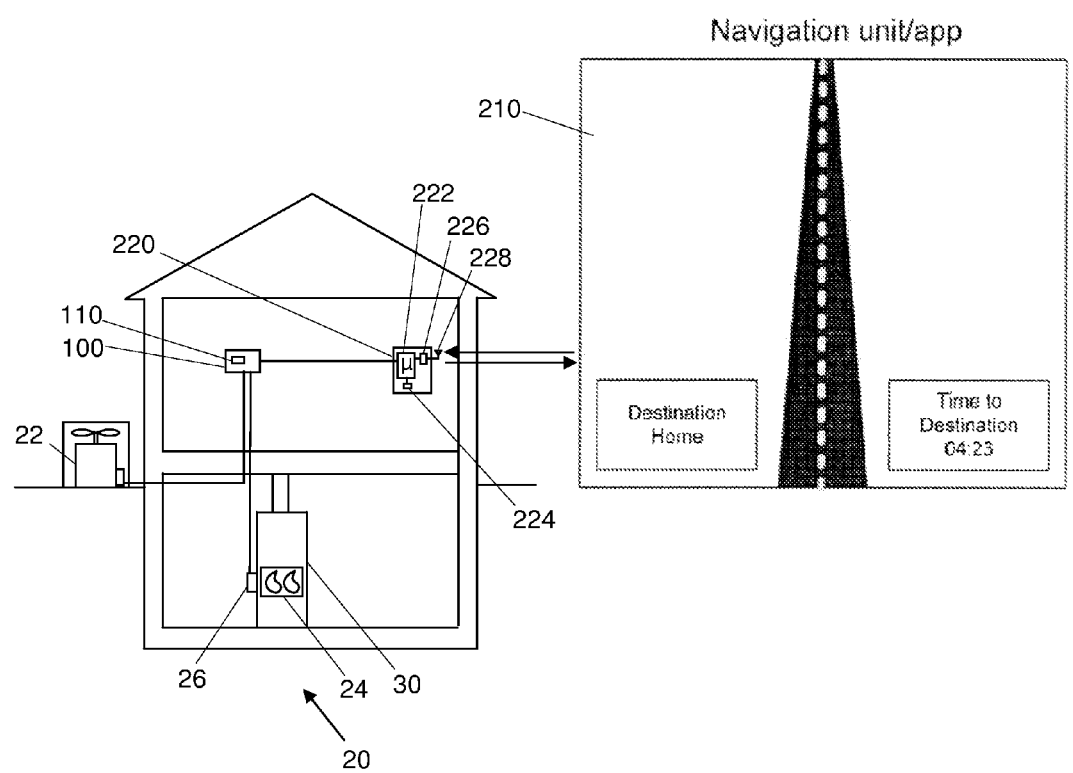
FIG. 1 is an illustration of a site having an HVAC system and a proximity detection module for detecting proximity of a location reporting device.

In the various embodiments of the present disclosure, a system is provided for remote control of at least one operating condition of a site. Referring to FIG. 1, a site 20 is shown, which may be a residential site, for example. The site 20 includes an HVAC system 30, which may include an air conditioning system having a compressor unit 22, and a furnace 24. The residential site may further include a heat pump, hot water heater, lighting systems, pool pump, and other types of energy consuming devices that may be controlled. A thermostat 100 is coupled to the HVAC system 30, and may be configured to control the HVAC system 30 and other various energy consuming devices. The thermostat 100 preferably includes a software program for controlling operation of the HVAC system 30 as needed to adjust the temperature for the site to maintain a desired temperature setting. The thermostat 100 may, for example, have a temperature setting associated with an occupancy state when a user is present at the site 20, and a set-back temperature setting for when a user is not present at the site 20. The thermostat 100 may also be programmable to include a schedule of two or more temperature settings for various time periods during the day. In one exemplary embodiment of a thermostat 100, the thermostat 100 includes an electronic memory, such as an electronically erasable programmable read-only-memory (EEPROM), in which at least an occupancy temperature setting and a set-back temperature setting are stored. The program may optionally have a schedule of two or more temperature settings for various time periods during the day. Such a schedule may include predefined occupancy settings such as a set-back temperature setting associated with an unoccupied state, an occupied temperature setting associated with an occupied state and a sleep temperature setting associated with an occupied-asleep state. The thermostat 100 preferably includes an internal temperature sensor that allows for detecting a sensed temperature within the site 20. The thermostat 100 may further include a display device 110. The thermostat 100 may be a wireless thermostat that is capable of wireless communication with other devices, and is preferably in communication with a site interface device or proximity detection module, as explained below.

According to one aspect of the present disclosure, a system is provided for remote control of an operating condition of a site 20 that includes a proximity detection module 220, which may be within an HVAC control 26, or connected to the HVAC control 26 or thermostat 100 via a Climate Talk CT-485 port. The proximity detection module detects the location and/or distance from the site 20 of a location reporting device 210. The location reporting device 210 may be a portable GPS device, or a mobile device. Preferably the location reporting device 210 is a mobile device 210 such as a cellular or mobile phone, or a smart phone such as a Blackberry® device, Android® device, or an iPhone® or iPad® tablet, which can communicate using a WIFI or 802.11 based wireless communication, WiMAX, Bluetooth communication, Zigbee communication, subscriber based wireless data communication networks such as the 3G or 4G network, PCS network, EDGE network or other wireless communication means.

Referring to FIG. 1, the proximity detection module 220 may include a controller or microprocessor 222 in communication with a wireless communication device such as a wireless transceiver chip 226 and antenna 228. The microprocessor 222 communicates with an electronic storage 224 for storage of data provided by the location reporting device or mobile device 210. The proximity detection module 220 is configured to establish wireless communication with the internet, or is coupled to a server using a broadband connection for connecting to the internet, or other wireless network for enabling communication of location data from a location reporting device 210, as explained below.

The location reporting device 210 or mobile device 210 is preferably configured to detect its location via GPS means, or cellular triangulation means, to enable present location or proximity detection. The location reporting device 210 or mobile device 210 may be configured to communicate its location data to a 'cloud' server site that is accessible via the internet, such that the location data of the location reporting device 210 or mobile device 210 can be accessed and obtained by the proximity detection module 220. Alternatively, the proximity detection module 220 may be directly accessible via the internet, such that the location reporting device 210 or mobile device 210 may directly communicate its location data to the proximity detection module 220. In such a case, the proximity detection module 220 may function as a mobile client interface. In each of the above configurations, the proximity detection module 220 is configured to receive or obtain location data for a location reporting device 210 or mobile device 210 (such as a smart phone, for example).

Accordingly, one preferred embodiment of a system is provided for remote control of at least one operating condition of a site 20 based on proximity location data. The system includes a proximity detection module 220 located at the site. The proximity detection module 220 includes a controller or microprocessor 222, which includes a selectively enabled proximity detection mode. The proximity detection module 220 is configured to detect a distance between a location reporting device 210 and the site 20, and to responsively determine an adjustment for altering an operating temperature setting for the site 20 based on the distance of the location reporting device 210 when the proximity detection mode is enabled.

In the exemplary embodiment shown in FIG. 1, the location reporting device 210 is a mobile device 210 that includes a present location or proximity detection application. The proximity detection module 220 is preferably configured to initiate altering of an operating temperature setting of the associated site 20 in response to receiving a communication regarding a location of the mobile device 210. The altering of an operating temperature setting may comprise an adjustment determined by the proximity detection module 220 based on location of the mobile device 210, which is used to offset to the present temperature setting for the site 20.

Specifically, the proximity detection module 220 is configured to receive location data from the mobile device 210 that is indicative of the location of the user of the mobile device 210. From the location data, the proximity detection module 220 can detect a distance that a user of the mobile device 210 may be from the site 20, and a direction that the user may be headed. For example, when the proximity detection module 220 detects that the distance from the site 20 has increased from previously received location data, the proximity detection module 220 determines that the user of the mobile device 210 is moving away from the site 20. When the proximity detection module 220 detects that the distance from the site 20 has decreased from a previous location, the proximity detection module 220 determines that the user of the mobile device 210 is moving towards the site 20.

The system shown in FIG. 1 may further comprise a thermostat 100 coupled to the proximity detection module 220, which is configured to adjust at least one temperature setting for the site 20 based on the adjustment determined by the proximity detection module 220. Accordingly, the proximity detection module 220 is configured to initiate altering of a temperature setting of the thermostat 100 for the associated site 20 in response to receiving a communication regarding the location of the mobile device 210. The mobile device 210 may comprise a cellular or mobile phone, an iPad® tablet or iPhone® device, a Blackberry® device, an Android® device or other equivalent smart phone device.

In the above exemplary embodiment, the proximity detection module 220 has a proximity detection mode that may be selectively enabled by a communication from the mobile device 210 to the proximity detection module 220. Specifically, the proximity detection mode may be enabled via a mobile device 210 that includes an application for displaying a selectable icon or other indicia for enabling the proximity detection mode. For example, the mobile device 210 may be a smart phone that includes an application for displaying a "Destination Home" icon as shown in FIG. 1, which a user may select before heading home to initiate a communication to the proximity detection module 220 for enabling the proximity detection mode. The application may further communicate data of an expected "Time to Destination" provided by the user, to provide an estimate of the travel time to travel to the site 20, as shown in FIG. 1.

According to another aspect of the present disclosure, a system is provided for remote control of operating conditions of a site 20 based on whether the mobile device 210 is within a zone of a predetermined distance from the site 20. Upon obtaining location data from the mobile device 210, the proximity detection module 220 at a site 20 is configured to determine, from a communication regarding the location of the mobile device 210, whether the mobile device 210 is within a particular zone relative to the site 20. Specifically, the proximity detection module 220 is configured to detect when an associated mobile device 210 is within a first zone (e.g., a zone less than 1 mile from the site 20), a second zone (e.g., a zone less than 3 miles from the site 20, or a third zone (e.g., a zone less than 5 miles from the site 20). It should be noted that the zones are not necessarily a radial distance from the site 20, and may be eccentric such as zone 260 shown in FIG. 2. Upon determining the location of the associated mobile device 210 within a predetermined zone relative to the site 20, the proximity detection module 220 is configured to determine an adjustment to adjust a current temperature setting for the site 20 based on whether the mobile device 210 is within the first zone, second zone or third zone, for example. The adjustment amount may be based on the proximity of a user of the mobile device 210 relative to the site 20, as explained below.

Figure 2:
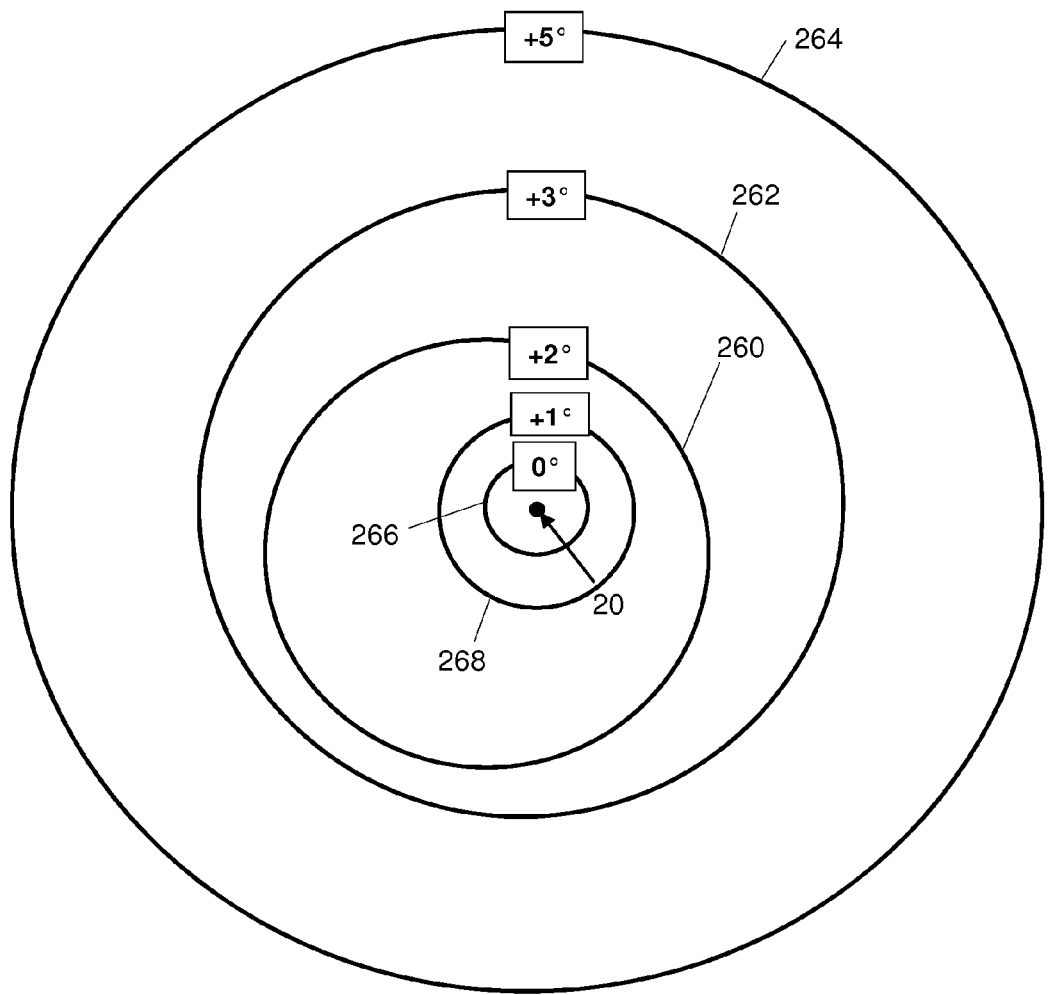
FIG. 2 is an illustration of a map depicting radius rings indicating various distances relative to the site.

Referring to FIG. 2, an illustration of a map is shown depicting radius rings indicating a number of zones at various distances relative to a residential site 20. The illustration in FIG. 2 depicts at least a first zone 260 less than 1 mile from the site 20, at least a second zone 262 less than 3 miles from the site 20, and at least a third zone 264 less than 5 miles from the site 20. When the mobile device 210 is within the first zone 260, the temperature setting is altered by 2 degrees Fahrenheit. When the mobile device 210 is within the second zone 262, the temperature setting is altered by 3 degrees Fahrenheit. When the mobile device 210 is within the third zone 264, the temperature setting is altered by 5 degrees. The system may be configured to include an additional smaller zone 268 in which there is only a 1 degree adjustment amount to the temperature setting, and another smaller zone 266 in which there is no adjustment amount to the temperature setting.

The proximity detection module 220 is configured to associate a given mobile device 210 with a residential site 20 and to control operation of a thermostat 100 and/or its temperature settings based on the detected location of the mobile device 210 associated with the site 20. While the above example illustrates a first zone that is less than 1 mile from the site 20, a second zone that is less than 3 miles from the site 20, and a third zone is greater than 5 miles from the site 20, other suitable distances may be employed. Similarly, the frequency at which communication of location data occurs may be increased or decreased as the location of the mobile device 210 becomes closer or further from the site 20.

According to another aspect of the present disclosure, a system is provided for control of at least one operating condition of a site 20 based on proximity of a mobile device 210 to the site 20, as determined by a connection with the mobile device 210. When the proximity detection module 220 is within the site 20 (e.g., residential site 20) and establishes a connection with a local WIFI network or Bluetooth communication device and/or a wireless router associated with the site 20, the microprocessor 222 of the proximity detection module 220 communicates information to the thermostat 100, which may responsively establish an 'occupied' temperature setting for site 20. Thus, the microprocessor 222 (or controller) can alter the temperature setting at the site 20 (or enable a programmed schedule) in response to detecting the mobile device 210 establishing a WIFI connection. Furthermore, when the WIFI connection is established with the mobile device 210, the proximity mode of the proximity detection module 220 can be disabled, such that communication of location data is no longer required. Similarly, the microprocessor 222 (or controller) can be used to alter the temperature setting for site 20 in response to detecting the mobile device 210 losing a WIFI connection, which would be indicative of the user leaving the site 20. Additionally, when the WIFI connection is lost (when the user leaves the site 20), the proximity mode of the proximity detection module 220 can be enabled.

Accordingly, a system is provided for control of at least one operating condition of a site 20 based on proximity of a mobile device 210 as determined by a connection with the mobile device 210. The system includes a proximity detection module 220 located at a site 20, including a controller having a selectively enabled proximity detection mode, wherein the controller is configured to detect when a mobile device 210 is at the site 20 based on the mobile device 210 establishing a connection with a WIFI network associated with the site 20, wherein the controller alters the temperature setting for the site 20 in response to detecting the mobile device 210 establishing a connection with a WIFI network associated with the site 20.

Figure 3:
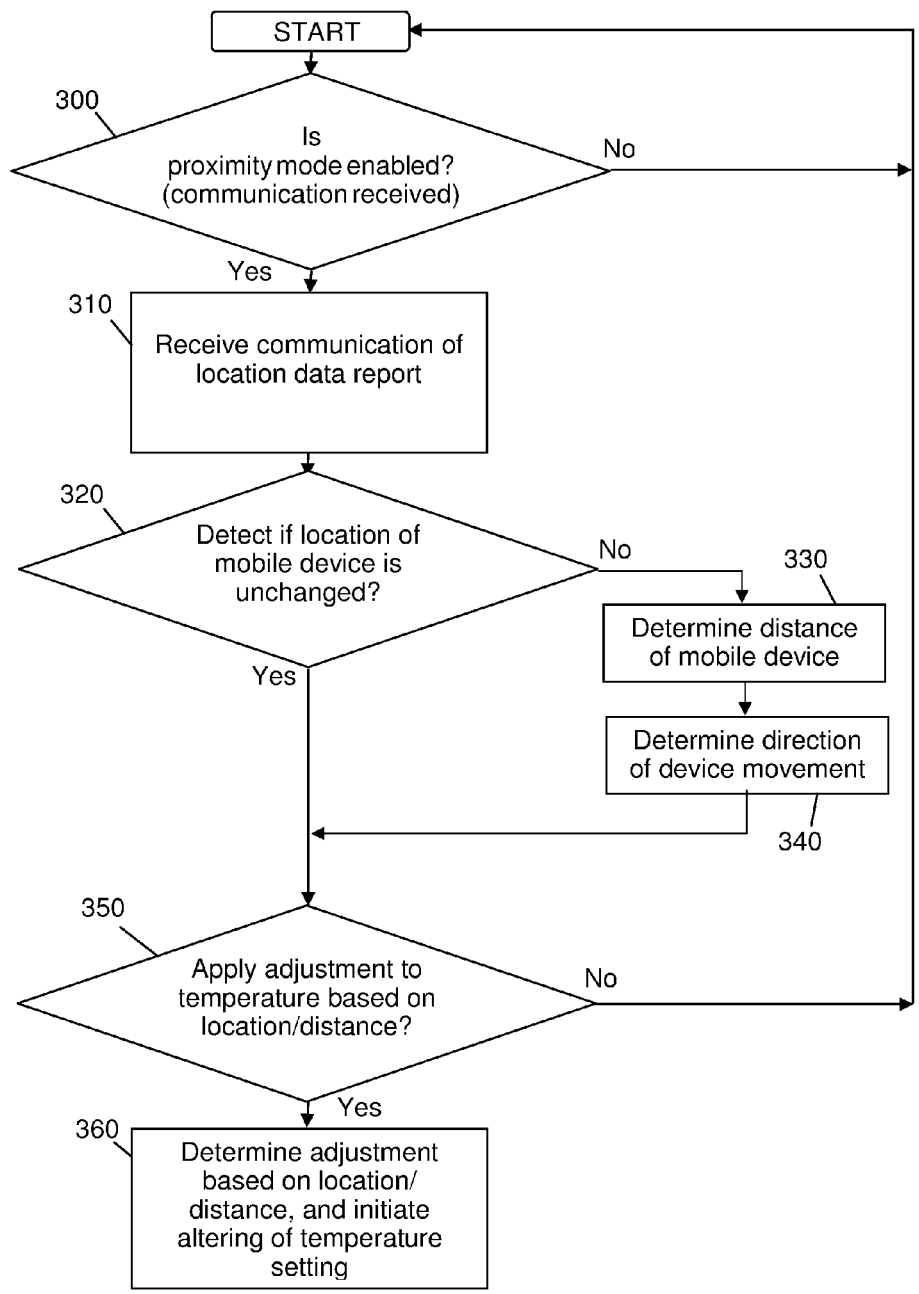
FIG. 3 shows a flow chart illustrating the operating control of the proximity detection module and system.

Referring to FIG. 3, a method is further provided for control of at least one operating condition of a site 20 based on proximity of a mobile device 210. The method comprises determining at step 300 whether a proximity mode is enabled, if applicable to the particular embodiment for remotely controlling operating temperature based on proximity of a mobile device. Where the proximity mode is enabled (or not a requirement), the method proceeds at step 310 to receive any communication or report of location data for a mobile device that is associated with a site (e.g., mobile device 210 in FIG. 1). The method further comprises the step 320 of determining or detecting if the location of the mobile device is unchanged, or whether the location has changed from previously received location data. At step 330, the method determines from the changed location data the distance between the mobile device and the site and, based on whether the distance is increasing or decreasing, determines the direction of movement of the mobile device 210 at step 340. Based on the location of the mobile device (e.g., based on whether the device is located within a zone, or based on the distance from the site), the method then determines at step 350 whether to apply an adjustment to the temperature setting for the site. The method then determines an adjustment at step 360, and initiates a signal to a thermostat, for example, for altering of the temperature setting for the site.

According to another aspect of the present disclosure, another preferred embodiment of a system is provided for remote control of a temperature setting for a site based on proximity of a mobile device. The system includes a thermostat 100 that controls a temperature setting for a site 20, as shown in FIG. 1, where the temperature setting is controlled based on proximity of a mobile device 210. The mobile device 210 includes a geospacial tracking device or other circuitry for determining present location or proximity detection (e.g., GPS or cellular triangulation means). The mobile device 210 includes a downloadable application that is configured to communicate or feed location data to a remote "cloud" server, and may further communicate a "Time to Destination" estimate to the site 20, as shown in FIG. 1. The frequency at which communication of location data occurs may increase or decrease as the mobile device 210 becomes closer or further from the site 20. The mobile device 210 is a cellular or mobile phone, or a smart phone such as a Blackberry® device, an Android® device, or an iPhone® device or iPad® tablet, which can communicate using a WIFI or 802.11 based wireless communication, WiMAX, a Bluetooth communication, Zigbee communication, subscriber based wireless data communication networks such as the 3G network or 4G network, PCS network, EDGE network or other wireless communication means, or any combination thereof.

Using the location data set by the mobile device 210, a remote server (or hosted server application) is configured to determine the distance between a mobile device 210 and the site 20 (FIG. 1). The remote server application is configured to determine an adjustment for altering an operating temperature setting for the site 20 based on the distance. For example, the remote server may be configured to determine an adjustment amount from the distance based on whether the mobile device 210 is within a first zone (e.g., a zone less than 1 mile from the site 20), a second zone (e.g., a zone less than 3 miles from the site 20, or a third zone (e.g., a zone greater than 5 miles from the site 20), as shown in FIG. 2. The remote server may receive location data for more than one mobile device, where the adjustment is determined by the closest mobile device. The remote server communicates a command or an adjustment to the thermostat 100, such as a set-back of a temperature setting for the site 20, which may be based on a user-profile configuration for geographic location established by the mobile device user. Accordingly, the remote server is able to communicate an adjustment for altering a temperature setting for the site 20.

In the above preferred embodiment, the thermostat 100 preferably includes a wireless communication device, such as the wireless transceiver chip 226 and antenna 228 in the proximity detection module 220 in FIG. 1. The thermostat 100 is configured to establish a broadband connection or other wireless network connection for enabling communication with the internet, to receive the adjustment or a command for altering a temperature setting. The thermostat 100 automatically adjusts the temperature based on the adjustment, which changes as the location of the mobile device 210 moves relative to site 20.

In this manner, a user of a mobile device 210 (or location reporting device such as a GPS device) would be able to automatically control temperature settings for a site 20, without having to enable any proximity detection module. The time of expected arrival at the site 20 could be updated or altered in route by use of GPS information, which can provide the present average speed and distance information, where the frequency of information transmittal may be altered as a function of this information. This would allow a user to more easily control temperature settings for a site 20, such that the user would be more likely to implement a setback temperature setting during unoccupied time periods that would result in reduced energy consumption. Accordingly, the above described systems provide a user of a mobile device with a more simplified way to control temperature settings or other operating conditions for a site, to reduce energy consumption during specific time periods.

The foregoing description of the embodiments has been provided for purposes of illustration and description. It is not intended to be exhaustive or to limit the invention. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the invention, and all such modifications are intended to be included within the scope of the invention.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures.

What is claimed is:

1. A system for remote control of an operating condition of a site, the system comprising a proximity detection module including a controller having a selectively enabled proximity detection mode, wherein the proximity detection module is configured to detect a distance of a location reporting device from a site when the proximity detection mode is enabled, and wherein the proximity detection module is configured to responsively determine an adjustment to alter an operating temperature setting for the site based on the distance of the location reporting device;

the system further configured to determine an alteration of the operating temperature setting in response to an estimate of travel time to the site sent by a user, the alteration determined based on a time at which the estimate is sent and without having to enable the proximity detection mode.

2. The system of claim 1, wherein the location reporting device comprises a mobile device that includes a present location or proximity detection application.

3. The system of claim 1, wherein the proximity detection mode is configured to be selectively enabled by a communication from the location reporting device to the proximity detection module.

4. The system of claim 1, wherein the proximity detection module is configured to initiate the determining of the adjustment of the operating temperature setting for the site in response to receiving a communication regarding a location of the location reporting device.

5. The system of claim 1, wherein:
the proximity detection module is configured to receive data from the location reporting device that is indicative of location and/or velocity of the location reporting device and to determine the adjustment after the alteration is determined.

6. The system of claim 1, wherein the proximity detection module is operable to detect a distance the location reporting device is from the site and a direction in which the location reporting device is moving.

7. The system of claim 1, wherein:
the proximity detection module is operable for determining that a user of the location reporting device is moving away from the site when the proximity detection module detects that the distance from the site has increased from a previous location;
and/or
the proximity detection module is operable for determining that a user of the location reporting device is moving towards the site when the proximity detection module detects that the distance from the site has decreased from a previous location.

8. The system of claim 1, wherein the location reporting device comprises one or more of a cellular phone, a mobile phone, a smart phone, and/or tablet.

9. The system of claim 1, wherein the proximity detection module is configured to detect when the location reporting device is within a first zone, a second zone, or a third zone relative to the site, where the proximity detection module is configured to determine an adjustment to adjust a current temperature setting for the site based on whether the mobile device is within the first zone, the second zone, or the third zone.

10. The system of claim 1, further comprising a thermostat coupled to the proximity detection module, the thermostat configured to adjust at least one operating condition for the site based on the adjustment determined by the proximity detection module.

11. A system for remote control of a temperature for a site, the system comprising a proximity detection module configured to detect when a location reporting device is within a first zone relative to a site, wherein the proximity detection module is configured to determine an adjustment to adjust a current temperature setting for the site based on whether the location reporting device is within the first zone;
the system further configured to determine an alteration of the temperature setting in response to an estimate of travel time to the site sent by a user, the alteration determined based on a time at which the estimate is sent and without using a location of the location reporting device.

12. The system of claim 11, wherein the adjustment is based on the proximity of the location reporting device to the site.

13. The system of claim 11, wherein the proximity detection module is configured to associate a mobile device with a residential site and to control a thermostat operation and/or settings based on the detected location of the mobile device for the site.

14. The system of claim 11, wherein the location reporting device comprises one or more of a cellular phone, a mobile phone, a smart phone, and/or tablet.

15. The system of claim 11, wherein the proximity detection module is configured to detect when the location reporting device is within the first zone, a second zone, or a third zone relative to the site, where the proximity detection module is configured to determine an adjustment to adjust a current temperature setting for the site based on whether the mobile device is within the first zone, the second zone, or the third zone.

16. The system of claim 11, wherein:
the first zone is less than one mile from the site; and/or
the second zone is less than three miles but more than one mile from the site; and/or
the third zone is less than five miles but more than three miles from the site.

17. The system of claim 11, wherein:
the temperature setting is altered by 2 degrees where the mobile device is within the first zone; and/or
the temperature setting is altered by 3 degrees where the mobile device is within the second zone; and/or
the temperature setting is altered by 5 degrees where the mobile device is within the third zone.

18. A system for remote control of an operating condition of a site, the system comprising a proximity detection module having a controller with a selectively enabled proximity detection mode, wherein the controller is configured to detect when a device is at the site based on the device establishing a local connection with a network associated with the site, and wherein the controller alters a temperature setting for the site in response to detecting, over a remote connection with the device, an estimate of time-to-arrival at the site sent by a user of the device, the altering performed using the estimate and a time the estimate is sent, and without having to enable the proximity detection mode.

19. The system of claim 18, wherein:
the controller disables the proximity detection mode when the local connection of the network is established with the device; and/or
the controller alters the temperature setting for the site in response to detecting that the local connection of the network to the device is lost; and/or
the controller enables the proximity detection mode in response to detecting that the local connection of the network to the device is lost.

20. The system of claim 18, wherein the proximity detection module is configured to receive communication of location data for the device, and to responsively determine an adjustment to alter the temperature setting for the site based on the location of the device relative to the site when the proximity detection mode is enabled.

21. The system of claim 18, wherein the device comprises one or more of a location reporting device, a cellular phone, a mobile phone, a smart phone, and/or tablet.

22. The system of claim 18, wherein the controller is configured to detect when a device is at the site based on the device establishing a connection with a Wi-Fi network associated with the site, and wherein the controller alters the temperature setting for the site in response to detecting that the device is establishing a connection with the Wi-Fi network.

23. A system for remote control of a temperature setting of a site based on proximity of a mobile device relative to the site, the system comprising a thermostat configured to alter a current temperature setting for the site in response to a communication of an adjustment that is based on (a) a distance between the site and a mobile device where the distance is determined from location data provided by the mobile device, and (b) a user-input time-to-arrival estimate sent by the mobile device and used to determine the adjustment without having to determine a distance between the site and the mobile device.

24. The system of claim 23, wherein the adjustment is determined in response to the time-to-arrival estimate and in accordance with a user-established temperature adjustment profile.

* * * * *